US007235747B1

(12) United States Patent
Tribou

(10) Patent No.: US 7,235,747 B1
(45) Date of Patent: Jun. 26, 2007

(54) ARM SCALE APPARATUS

(76) Inventor: Gene L. Tribou, 7740 Daetwyler Dr., Orlando, FL (US) 32812

( * ) Notice: Subject to any disclaimer, the term of this patent is extended or adjusted under 35 U.S.C. 154(b) by 0 days.

(21) Appl. No.: 11/588,140

(22) Filed: Oct. 27, 2006

(51) Int. Cl.
*G01G 19/52* (2006.01)

(52) U.S. Cl. .................................. 177/148; 177/245

(58) Field of Classification Search ............... 177/126, 177/131, 148–149, 245
See application file for complete search history.

(56) References Cited

U.S. PATENT DOCUMENTS

| 626,052 | A | | 5/1899 | Carter | |
|---|---|---|---|---|---|
| 634,747 | A | | 10/1899 | Crofford | |
| 2,937,016 | A | | 5/1960 | Westman | |
| 3,090,454 | A | | 5/1963 | Farrar et al. | |
| 3,974,491 | A | | 8/1976 | Sipe | |
| 4,056,156 | A | | 11/1977 | Dayton | |
| 4,711,313 | A | | 12/1987 | Iida et al. | |
| 5,119,585 | A | * | 6/1992 | Camp .......................... | 43/53.5 |
| 5,771,492 | A | | 6/1998 | Cozza | |
| 5,852,258 | A | | 12/1998 | Tribou | |
| 5,962,817 | A | * | 10/1999 | Rodriguez ................... | 177/126 |
| 5,986,222 | A | * | 11/1999 | Helberg ....................... | 177/148 |
| 5,987,310 | A | * | 11/1999 | Gray ........................ | 455/575.6 |
| 6,236,001 | B1 | * | 5/2001 | Shymko ...................... | 177/149 |
| 6,339,198 | B1 | * | 1/2002 | Yamanouchi ............... | 177/148 |
| 6,491,649 | B1 | | 12/2002 | Ombrellaro | |
| 6,930,608 | B2 | | 8/2005 | Grajales et al. | |
| 7,156,918 | B2 | * | 1/2007 | Marks ......................... | 177/168 |
| 2005/0051586 | A1 | * | 3/2005 | Siwak et al. | |
| 2007/0007048 | A1 | * | 1/2007 | Gill | |
| 2007/0034421 | A1 | * | 2/2007 | Ho et al. | |

* cited by examiner

*Primary Examiner*—Randy W. Gibson
(74) *Attorney, Agent, or Firm*—William M. Hobby, III

(57) ABSTRACT

An arm scale apparatus includes a casing shaped to fit partly around a person's arm and having a casing strap attached to the casing and having a fastener thereon for strapping the casing to a person's arm. A display on the casing is positioned to face a person having the casing attached to the person's arm. A tray coupling platform is mounted on top of the casing positioned for removably mounting a tray thereto in a position for holding materials to be weighed therein while the casing is mounted to a person's arm. A tray is removably attached to the tray coupling platform.

9 Claims, 2 Drawing Sheets

ARM SCALE APPARATUS

BACKGROUND OF THE INVENTION

The present invention relates to an arm attached scale and to a method of weighing material while a person is using his hands.

In the past, it has been common to provide a wide variety of weighing scales for weighing different materials. Bathroom scales are used to determine a person's weight in their homes while retail stores use weighing scales for measuring various types of materials, such as food which is sold by weight. It is common to use small weighing scales in restaurants and food establishments especially to measure quantities of meat to provide uniform servings and for better cost control. Typically, scales for this purpose are placed adjacent where the meat or other food materials are being handled. The food materials are placed on the scale and small portions added or removed prior to placing on a food plate or sandwich. Small electronic postage scales are used for determining the amount of postage for an envelope or package.

The present invention is directed towards a weighing device for use in restaurants or other food establishments for the rapid determination of food or material quantity by weight and is provided with an arm mounted scale in which the materials can be grasped with one hand and placed on the scale on the other arm and instantly weighed.

Typical prior art U.S. patents for weighing devices may be seen in the Carter patent, U.S. Pat. No. 626,052 for ice weighing tongs in which a pair of ice tongs have incorporated a weighing device so that when the ice is grasped with the tongs and the weight rapidly ascertained. In the Crofford U.S. Pat. No. 634,747, a combined scale and scoop is provided in which a person holding the scoop can scoop out food or other materials and determine the weight of the material scooped with the weighing scale. In the Westman U.S. Pat. No. 2,937,016, and Farrar et al. U.S. Pat. No. 3,090,454, handle weighing mechanisms are provided for luggage or bags so that by lifting the bag by the handle, the weight of the contents of the bag is determined. There are a variety of other U.S. patents which combine the weighing of volume measurements with scoops or pouring devices.

In my prior U.S. Pat. No. 5,852,258 for a Glove Weighing Apparatus and Method, a hand glove is removably attachable to a person's hand which covers or is attached to a weighing device including a scale operatively attached to the weighing device. The scale is removably attached to a person with a glove and may include a pressure transducer, such as a piezoelectric crystal to generate an electrical signal responsive and analogous to the pressure applied thereto. Alternatively, the weighing device may also be a liquid filled container which applies a pressure to a diaphragm responsive to the weight placed on the weighing device.

The present weighing device is especially adapted for use in restaurants and retail food establishments for obtaining a quick approximation of the weight of each portion of food being served.

SUMMARY OF THE INVENTION

An arm scale apparatus includes a casing shaped to fit partly around a person's arm and having a casing strap attached to the casing having a fastener thereon for strapping the casing to a person's arm. A display on the casing is positioned to face a person having the casing attached to the person's arm. A tray coupling platform is mounted on top of the casing positioned for removably mounting a tray thereto in a position for holding materials to be weighed therein while the casing is mounted to a person's arm. A tray is removably attached to the tray coupling platform. Batteries are mounted in the casing for powering the scale. At least one pressure sensor is mounted under the tray coupling platform for sensing pressure from the tray coupling platform for determining the weight of the material in a tray mounted to the platform and displaying the weight on the display. This allows materials to be weighed by a person while using his hands, such as in restaurants or food establishments, especially to measure quantities of meat or the like.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
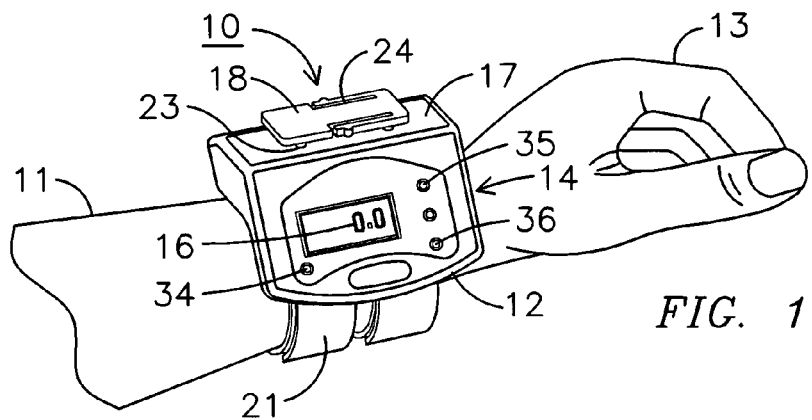
FIG. 1 is a perspective view of an arm scale in accordance with the present invention attached to a person's arm.
Figure 2:
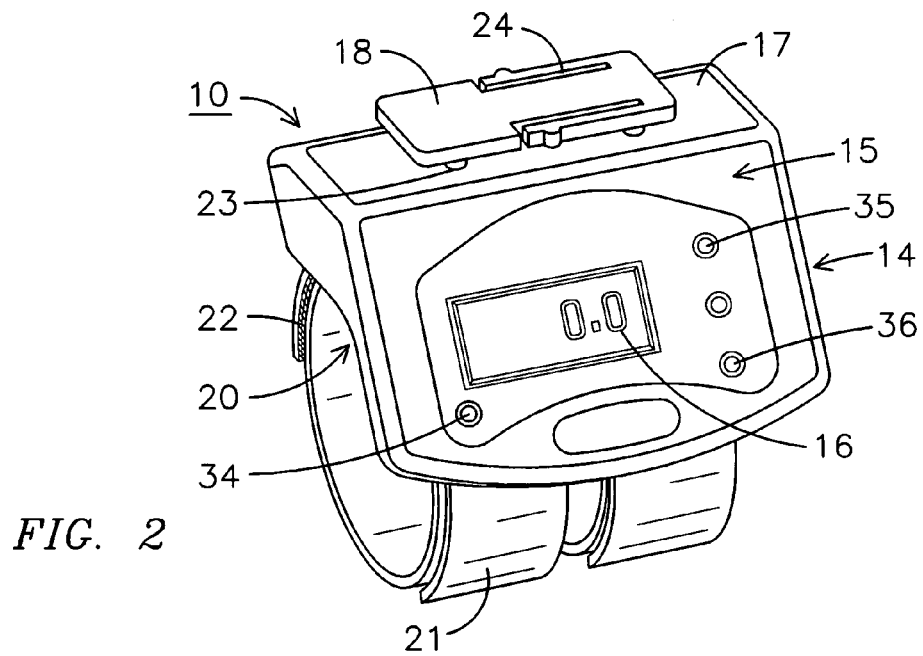
FIG. 2 is a perspective view of the arm scale of FIG. 1.

Referring to the drawings and to FIGS. 1 and 2, an arm scale or weighing apparatus 10 is shown mounted to a person's arm 11 in FIG. 1 adjacent the wrist 12 near the hand 13. The scale has the casing 14 having a display surface 15 with a display 16 thereon and a top surface 17 having a table coupling platform 18 attached thereto. The casing 14 has a curved side 20 shaped to partially wrap around a person's arm 11 and includes a pair of straps 21 each having VELCRO or hook and loop fasteners 22 thereon. The tray coupling platform 18 has a plurality of pressure sensors 23 positioned thereunder, which pressure sensors may be piezoelectric pressure sensors or any type desired, and has the tray coupling platform 18 mounted for pressing thereagainst. The tray coupling platform has a pair of snap couplings 24 for movably attaching a tray thereto.

Figure 3:
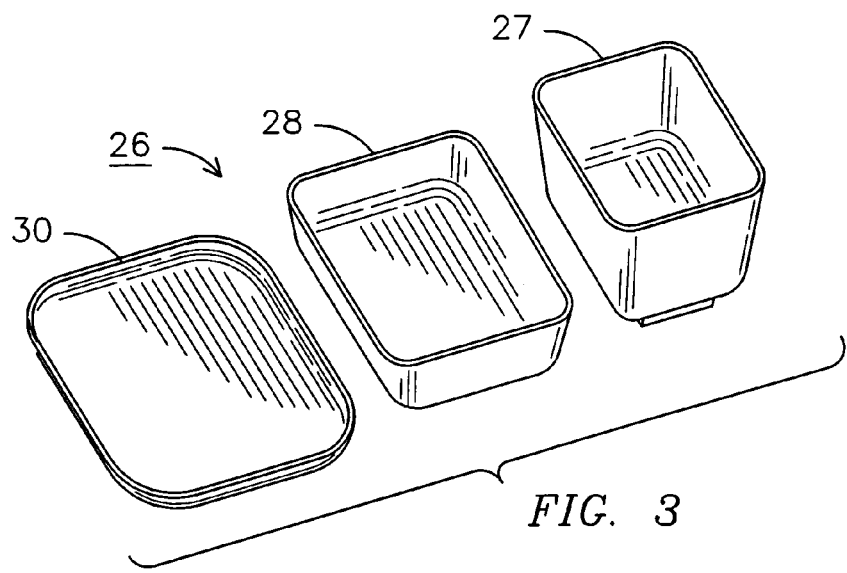
FIG. 3 is a perspective view of different trays for attachment to the arm scale of FIGS. 1 and 2.

As seen in FIG. 3, different size trays 26 may be attached to the tray coupling platform 18, such as the smaller tray 27 with raised sides, for placing a material to be weighed therein or an intermediate size tray 28 having shorter sides for placing different materials or amounts of materials therein or a larger generally flat tray 30.

Figure 4:
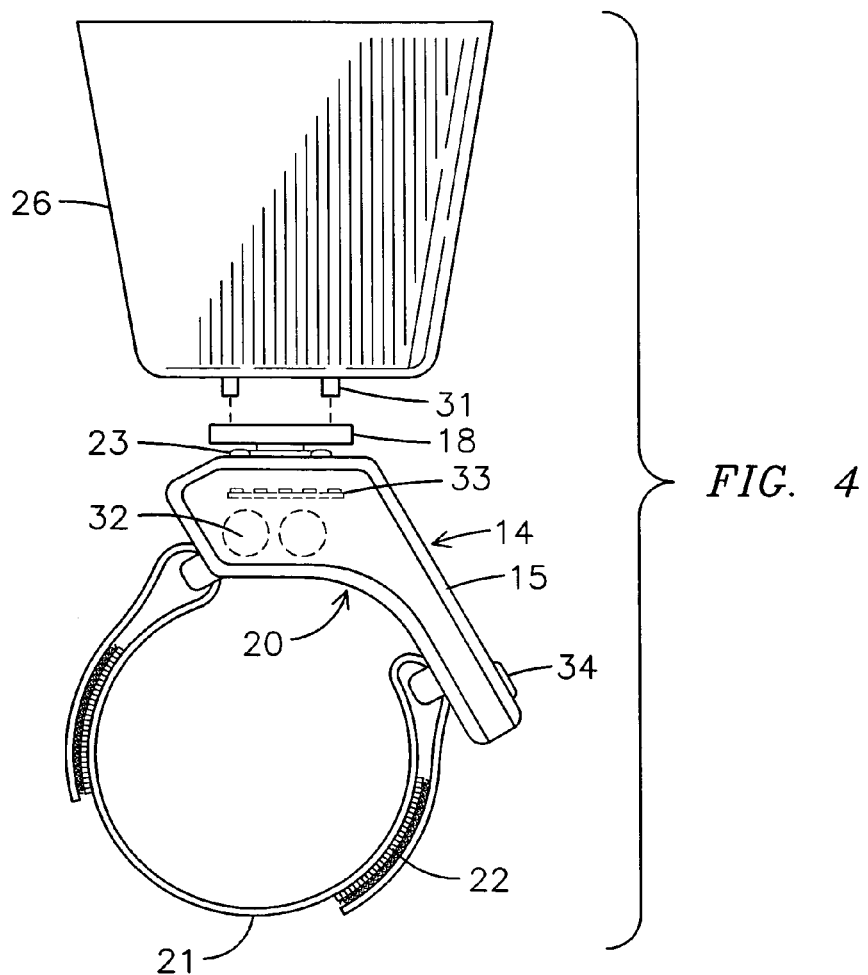
FIG. 4 is a sectional view of the arm scale of FIGS. 1 and 2 having a tray mounted thereto.

As seen in FIG. 4, the tray 26 has connector portions 31 for attaching with the snaps 24. Batteries 32 are mounted within the casing 14 as is the electronic circuit 33 which is connected to the sensors 23 for calculating the weight based upon the pressure applied to the sensors 23 for display on the display 16.

In FIGS. 1 and 2, an on/off button 34 is illustrated as is a calibration or nulling switch 35 and a scale switch 36 for switching between ounces and grams. The electronics are the same as used in other weighing devices, such as a small electric postal scale, and is powered by the batteries 32 which also powers the display 16.

Figure 5:
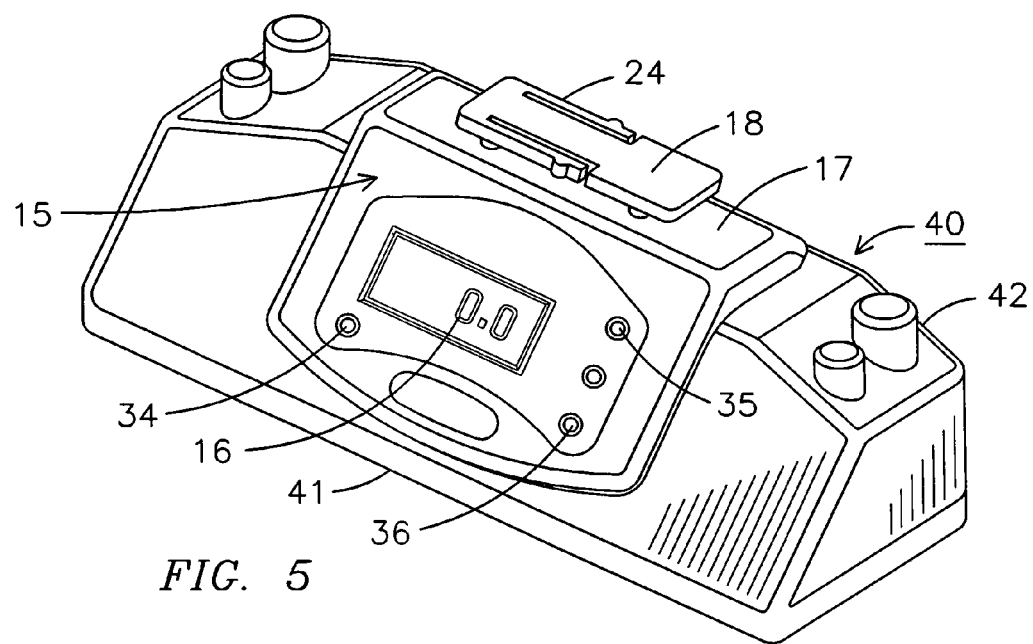
FIG. 5 is a perspective view of an arm scale apparatus of FIGS. 1 and 2 mounted in a base for use on a table.

FIG. 5 illustrates the scale 10 supported in a table top base 40 which has been shaped to receive the casing 14 thereinto and has a bottom 41 for sitting upon a bench or table or the like. The base 40 also has tray supports 42 for holding different size trays adjacent the arm scale 10. The arm scale 10 has the display 16 positioned for easy reading when placed in the base 40 with the tray coupling platform 18 positioned on top for receiving a tray which are locked within the snaps 24. The box 40 and the casing can be made of a rigid plastic.

In operation, the arm scale 10 is strapped to a person's arm 11 adjacent the wrist 12 by placing the curve portion 20 around the person's arm to face in an upright position when the hand 13 is positioned as shown in FIG. 1. Straps 21 are fastened with the hook and loop material 22 to strap the scale to a person's arm, positioning the display 16 for easy reading by the person using the hand 13. The tray 26 is attached to the tray coupling platform 18 with the snaps 24 and is supported thereon. The scale is turned on with the switch 34 and after the tray is mounted and empty, the scale is nulled or calibrated with the switch 35. Materials can be readily placed within the tray 26 with the person's other hand to adjust the weight to quickly determine a portion, as needed in a restaurant. The arm scale apparatus of the present invention advantageously can be placed in an accompanying base 40 and supported therein and used on the work table or bench with a display facing the user and the tray coupling platform 18 placed on top. Different size trays 27, 28 and 30 can be rapidly interchanged on the platform 18 and nulled with a null switch 35.

It should be clear at this time that an easy to use arm scale apparatus has been provided which can be used on a person's arm for rapidly determining the weight of material and is especially adapted for restaurant use but that the scale can be quickly positioned in a base for using on a bench top. However, the present invention should not be construed as limited to the forms shown which are to be considered illustrative rather than restrictive.

I claim:

1. A arm scale apparatus comprising:
   a casing shaped to fit partly around a person's arm;
   a casing strap attached to said casing and having a fastener thereon for strapping said casing to a person's arm;
   a display on said casing positioned to face a person having said casing attached on the person's arm;
   a tray coupling platform mounted on top of said casing positioned for removably mounting a tray thereto in a position for holding materials to be weighted therein while said casing is mounted to a person's arm;
   a tray removably attached to said tray coupling platform;
   a battery mounted in said casing for powering said scale;
   at least one pressure sensor mounted under said tray coupling platform for sensing pressure from said tray coupling platform for determining the weight of material in a tray and displaying said weight on said display;
   whereby materials can be weighted by a person while using his hands.

2. The arm scale apparatus in accordance with claim 1 in which said tray coupling platform has a snap connector thereon for removably attaching a tray thereto.

3. The arm scale apparatus in accordance with claim 1 in which said tray coupling platform has two snap connectors thereon for removably attaching a tray thereto.

4. The arm scale apparatus in accordance with claim 1 in including a base stand shaped for supporting said arm scale on for using said scale on a table top.

5. The arm scale apparatus in accordance with claim 4 in which base stand has a tray holder thereon for holding a tray for removable attachment to said tray coupling platform.

6. The arm scale apparatus in accordance with claim 4 in which said display is an LCD display.

7. The arm scale apparatus in accordance with claim 6 in which casing strap fastener is a hook and loop fastener.

8. The arm scale apparatus in accordance with claim 7 having two casing straps each having a hook and loop fastener.

9. The arm scale apparatus in accordance with claim 1 having scale electronics coupled between said pressure sensor and said display.

* * * * *